(12) United States Patent
Zhao et al.

(10) Patent No.: US 10,304,101 B2
(45) Date of Patent: May 28, 2019

(54) AGE VERIFICATION THROUGH MOBILE WALLET METHOD AND APPARATUS

(71) Applicant: MasterCard International Incorporated, Purchase, NY (US)

(72) Inventors: Michael Zhao, New York, NY (US); Jeremy Pastore, Brooklyn, NY (US); Arun Elangovan, Astoria, NY (US)

(73) Assignee: Mastercard International Incorporated, Purchase, NY (US)

( * ) Notice: Subject to any disclaimer, the term of this patent is extended or adjusted under 35 U.S.C. 154(b) by 167 days.

(21) Appl. No.: 14/624,501

(22) Filed: Feb. 17, 2015

(65) Prior Publication Data
US 2016/0239887 A1 Aug. 18, 2016

(51) Int. Cl.
| | | |
|---|---|---|
| *G06Q 30/06* | (2012.01) | |
| *G06Q 20/40* | (2012.01) | |
| *G06Q 20/20* | (2012.01) | |
| *G06Q 20/36* | (2012.01) | |

(52) U.S. Cl.
CPC ....... *G06Q 30/0607* (2013.01); *G06Q 20/204* (2013.01); *G06Q 20/363* (2013.01); *G06Q 20/405* (2013.01); *G06Q 20/4014* (2013.01); *G06Q 20/4016* (2013.01)

(58) Field of Classification Search
CPC ........ G06Q 20/00; G06Q 20/40; G06Q 40/00; G06Q 20/34; G06Q 99/00; G06Q 30/00; G06Q 30/06; G06Q 20/30; G06F 7/00; G06F 7/10; G06F 21/00; G06F 17/30; G06K 7/01; G06K 7/08; G06K 13/08

USPC ..... 705/30, 44, 75, 41, 64, 26.1, 35, 38, 17; 235/380–385, 379, 439

See application file for complete search history.

(56) References Cited

U.S. PATENT DOCUMENTS

| | | | |
|---|---|---|---|
| 8,355,992 B1* | 1/2013 | Haugh | G07G 3/006 705/64 |
| 9,189,788 B1* | 11/2015 | Robinson | G06Q 20/40145 |
| 2003/0177102 A1* | 9/2003 | Robinson | G06Q 20/04 705/75 |
| 2006/0277148 A1* | 12/2006 | Thackston | G06Q 20/02 705/41 |
| 2008/0071674 A1* | 3/2008 | Thackston | G06Q 20/10 705/38 |
| 2008/0275748 A1* | 11/2008 | John | G06Q 30/06 705/35 |
| 2009/0063312 A1* | 3/2009 | Hurst | G06Q 20/105 705/30 |
| 2010/0223184 A1* | 9/2010 | Perlman | G06Q 20/04 705/44 |
| 2010/0234987 A1* | 9/2010 | Benschop | G06Q 20/342 700/237 |
| 2011/0072039 A1* | 3/2011 | Tayloe | G06F 21/6218 707/769 |
| 2011/0145147 A1* | 6/2011 | Wylie | G06Q 20/40 705/44 |
| 2011/0251909 A1* | 10/2011 | Clark | G06K 13/08 705/17 |
| 2012/0028612 A1* | 2/2012 | Hurst | G06Q 20/105 455/411 |
| 2012/0030044 A1* | 2/2012 | Hurst | G06Q 20/105 705/18 |

(Continued)

*Primary Examiner* — Olusegun Goyea
(74) *Attorney, Agent, or Firm* — Ballard Spahr LLP

(57) ABSTRACT

A system, method, and computer-readable storage medium configured to verify minimum age of accountholders, to enable age restrictions on purchases.

20 Claims, 5 Drawing Sheets

(56) References Cited

U.S. PATENT DOCUMENTS

| | | | | |
|---|---|---|---|---|
| 2013/0007849 A1* | 1/2013 | Coulter | ................... | G06F 21/10 |
| | | | | 726/4 |
| 2013/0048720 A1* | 2/2013 | Lewis | ................... | G06Q 10/00 |
| | | | | 235/382 |
| 2013/0073460 A1* | 3/2013 | Paquin | ................... | G06Q 40/02 |
| | | | | 705/44 |
| 2013/0179336 A1* | 7/2013 | Lyons | ................... | G06Q 20/30 |
| | | | | 705/39 |
| 2013/0204786 A1* | 8/2013 | Mattes | ............... | G06Q 20/4014 |
| | | | | 705/44 |
| 2015/0120559 A1* | 4/2015 | Fisher | ................ | G06Q 20/4014 |
| | | | | 705/44 |

* cited by examiner

US 10,304,101 B2

AGE VERIFICATION THROUGH MOBILE WALLET METHOD AND APPARATUS

BACKGROUND

Field of the Disclosure

Aspects of the disclosure relate in general to financial services. Aspects include a method and analysis platform to verify minimum age of accountholders, to enable age restrictions on purchases.

Description of the Related Art

A payment card is a card that can be used by an accountholder and accepted by a merchant to make a payment for a purchase or in payment of some other obligation. Payment cards include credit cards, debit cards, charge cards, and Automated Teller Machine (ATM) cards. Payment cards provide the clients of a financial institution ("accountholders") with the ability to pay for goods and services without the inconvenience of using cash.

In a different field, society restricts the purchase or use of certain goods or services from minors. For example, in most states in the United States, alcohol is prohibited from sale to individuals less than twenty-one years of age, while tobacco products cannot be sold to individuals less than eighteen years old.

As a result of these restrictions, some under-age minors attempt to make purchases using fraudulent ("fake") identification. These "fake IDs" include counterfeit drivers licenses and other forged identification. The purchase of fake identification fuels criminal enterprise and other unsavory activities.

In some jurisdictions, strict penalties are incurred to merchants when violations occur. These penalties include monetary penalties or potential loss of business licenses.

SUMMARY

Embodiments include a system, device, method and computer-readable medium to verify minimum age of accountholders, to enable age restrictions on purchases.

A payment network server is configured to verify a minimum age of an accountholder in a payment transaction. The server includes a processor and a network interface. The network interface receives transaction data from an acquirer. The transaction data describes the payment transaction and includes: an account identifier associated with the accountholder and a minimum age inquiry. The minimum age inquiry specifies a minimum transaction age. The processor matches the account identifier with an accountholder entry in a database. The accountholder entry includes a birthdate of the accountholder. The processor determines an accountholder age based on a present date and the birthdate of the accountholder. The network interface transmits to the acquirer a transaction decline when the accountholder age is less than the minimum transaction age.

A point-of-sale device includes a processor, a communication interface and a display. The processor determines that an age-restricted good or service is being purchased. The age-restricted good or service having a minimum transaction age. The communication interface receives from a payment device an account identifier associated with an accountholder. The communication interface transmits a minimum age inquiry to the payment device. The minimum age inquiry specifies a minimum transaction age. The communication interface receives from the payment device a response to the minimum age inquiry. The display displays a transaction decline when the response indicates the accountholder does not meet the minimum transaction age.

DETAILED DESCRIPTION

One aspect of the disclosure includes the realization that payment accountholders provide their birthdates to payment account issuers, and that this information can be provided in turn to payment networks.

Another aspect of the disclosure is the realization that once the birthdate is provided to an issuer or payment network, the birthdate may be used to verify accountholder age.

Aspects include payment network embodiments that verify the minimum age of an accountholder as part of a payment authorization process.

Further aspects include a point-of-sale device embodiment that verify the minimum age of an accountholder as part of a payment authorization process when payment is made via a mobile payment device.

While embodiments described herein are applied to a payment network and point-of-sale context, it is understood by those familiar with the art that the concepts, apparatus, system and methods described herein may also be applicable to an issuer and point-of-sale context.

The systems and processes are not limited to the specific embodiments described herein. In addition, components of each system and each process can be practiced independently and separately from other components and processes described herein. Each component and process also can be used in combination with other assembly packages and processes.

Figure 1:
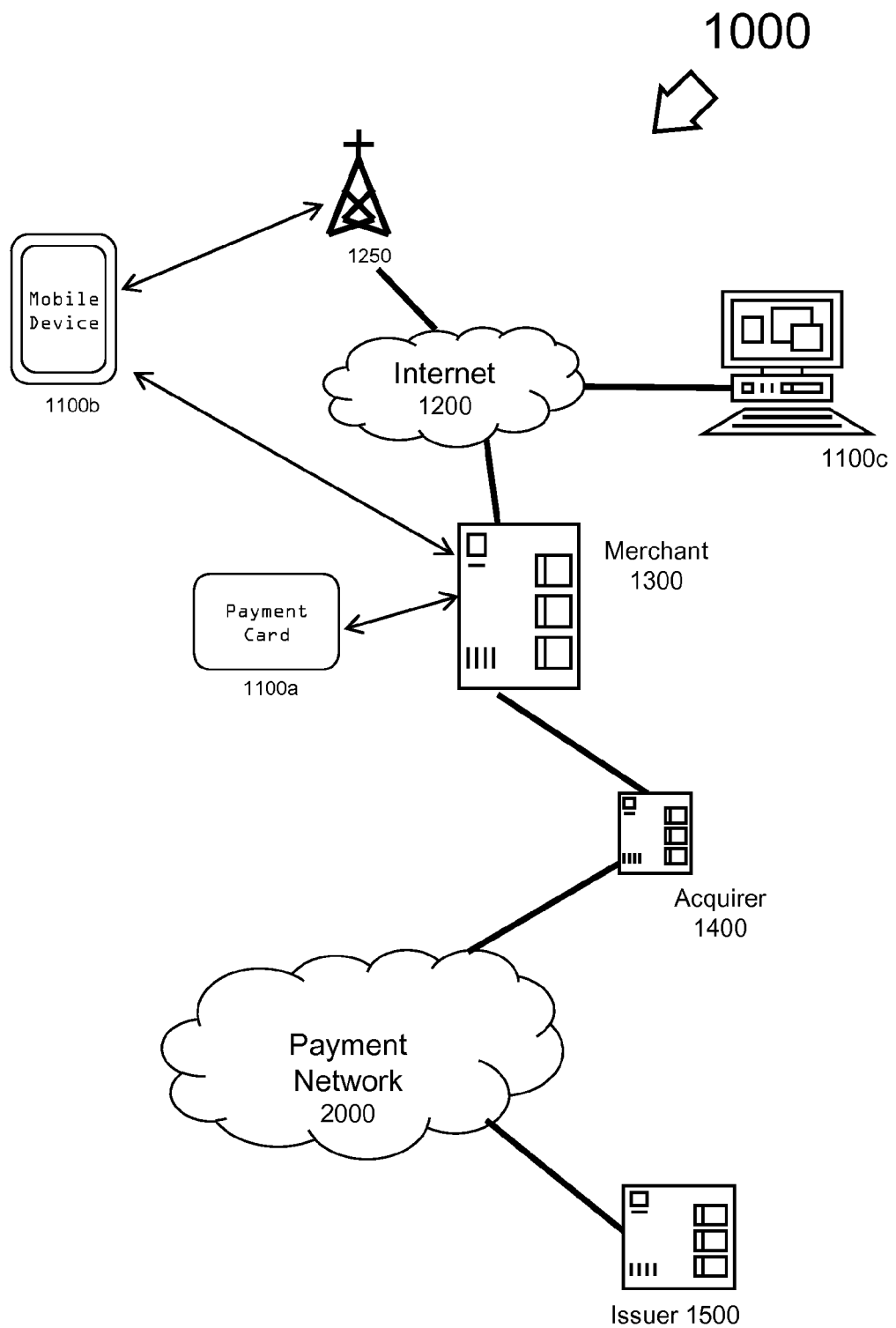
FIG. 1 is a block diagram illustrating a financial transaction involving an age-restricted purchase using a payment network.

FIG. 1 is a block diagram 1000 illustrating a financial transaction involving an age-restricted purchase using a payment network. The present disclosure is related to a payment system, such as a credit card payment system using a payment network 2000, such as the MasterCard® interchange, Cirrus® network, or Maestro®. The MasterCard interchange is a proprietary communications standard promulgated by MasterCard International Incorporated of Purchase, N.Y., for the exchange of financial transaction data between financial institutions that are customers of MasterCard International Incorporated. Cirrus is a worldwide interbank network operated by MasterCard International Incorporated linking debit and payment devices to a network of ATMs throughout the world. Maestro is a multi-national debit card service owned by MasterCard International Incorporated.

In a financial payment system, a financial institution called the "issuer" 1500 issues a payment account to a consumer, who uses payment device 1100*a-c* to tender payment for an age-restricted purchase from merchant 1300. Payment devices may include a payment card 1100*a*, mobile device 1100*b* (such as key fobs, mobile phones, tablet computers, Personal Digital Assistants (PDAs), electronic wallets and the like), or computers 1100*c*. Payment devices may be used to tender purchase in-person at merchant 1300, or when connected via a mobile telephone network 1250 or the internet 1200.

In this example, a user presents the payment device 1100 to a point-of-sale device at merchant 1300. The merchant 1300 is affiliated with a financial institution. This financial institution is usually called the "acquirer," the "acquiring bank" or "acquirer bank" 1400. The acquirer 1400 may be a merchant bank or a payment service provider (PSP). When a payment device 1100 is tendered at merchant 1300, the merchant 1300 electronically requests authorization from the acquirer 1400 for the amount of the purchase. The authorization request includes in inquiry on whether the accountholder is above the minimum age for the age-restricted purchase. The request is performed electronically with the consumer's account information. For payment cards, the consumer's account information may be retrieved from the magnetic stripe on a payment card 100*a* or via a computer chip imbedded within the card 1100*a*. For other types of payment devices 1100*b-c*, the consumer's account information may be retrieved by wireless methods, such as contactless communication like MasterPass® or via Near Field Communication (NFC). The account information, along with the age verification inquiry, is forwarded to transaction processing computers of the acquirer 1400. Alternatively, an acquirer 1400 may authorize a third party to perform transaction processing on its behalf. In this case, the merchant 1300 will be configured to communicate with the third party. Such a third party is usually called a "merchant processor" or an "acquiring processor" (not shown).

The computers of the acquirer 1400 or the merchant processor will communicate, via payment network 2000, with the computers of the issuer 1500 to determine whether the consumer's account is in good standing and whether the accountholder is above the age required for age-restricted purchase. It is understood that any number of issuers 1500 may be connected to payment network 2000.

When the accountholder is above the age required and the request for authorization is accepted, the available credit balance of accountholder's account is decreased.

After a transaction is captured, a clearing process occurs.

Eventually, the transaction is settled between the merchant 1300, the acquirer 1400, and the issuer 1500.

Figure 2:
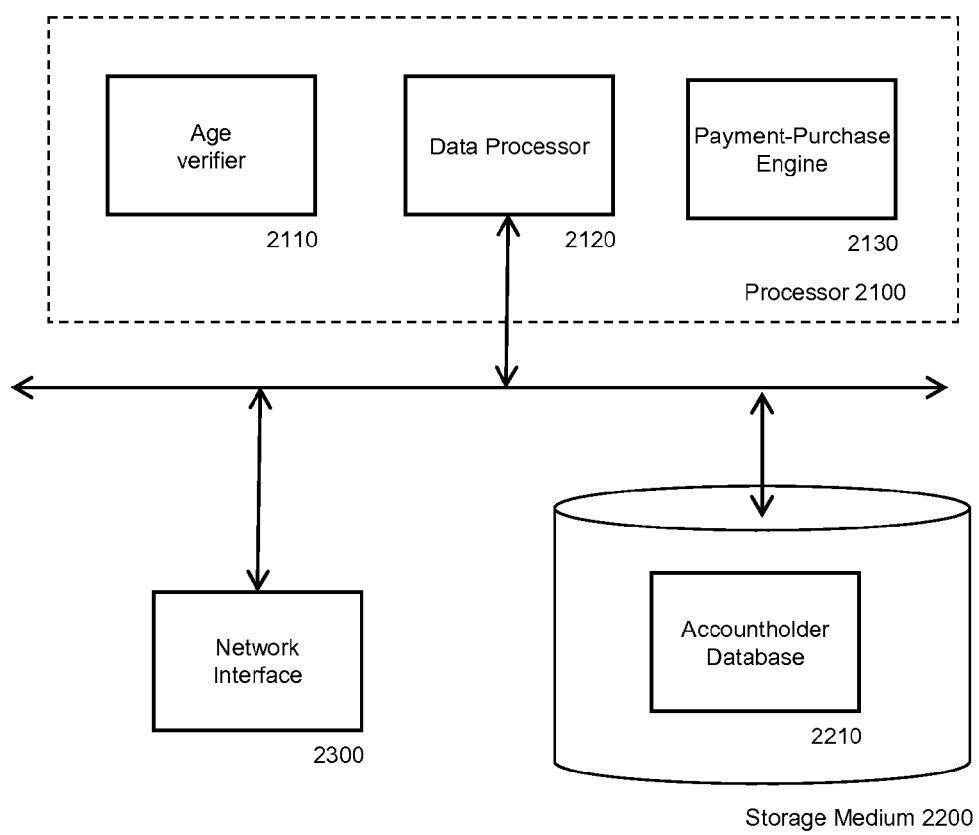
FIG. 2 is an expanded block diagram of an exemplary embodiment of a server architecture of a payment network embodiment configured to verify minimum age of accountholders, to enable age restrictions on purchases.

Embodiments will now be disclosed with reference to a block diagram of an exemplary payment network server 2000 of FIG. 2, configured to verify minimum age of accountholders, to enable age restrictions on purchases, constructed and operative in accordance with an embodiment of the present disclosure.

Payment network server 2000 may run a multi-tasking operating system (OS) and include at least one processor or central processing unit (CPU) 2100, a non-transitory computer-readable storage medium 2200, and a network interface 2300.

Processor 2100 may be any central processing unit, microprocessor, micro-controller, computational device or circuit known in the art. It is understood that processor 2100 may temporarily store data and instructions in a Random Access Memory (RAM) (not shown), as is known in the art.

As shown in FIG. 2, processor 2100 is functionally comprised of an age verifier 2110, a payment-purchase engine 2130, and a data processor 2120.

Data processor 2120 interfaces with storage medium 2200 and network interface 2300. The data processor 2120 enables processor 2100 to locate data on, read data from, and writes data to, these components.

Payment-purchase engine 2130 performs payment and purchase transactions, and may do so in conjunction with age verifier 2110.

Age verifier 2110 is the structure that enables age verification in an age-restricted purchase transaction. Age verifier 2110 calculates the age of an accountholder using the present date and a stored birthdate for an accountholder; the stored birthdate is stored in an accountholder database 2210.

These structures may be implemented as hardware, firmware, or software encoded on a computer readable medium, such as storage medium 2200. Further details of these components are described with their relation to method embodiments below.

Computer-readable storage medium 2200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. In some embodiments, computer-readable storage medium 2200 may be remotely located from processor 2100, and be connected to processor 2100 via a network such as a local area network (LAN), a wide area network (WAN), or the Internet.

In addition, as shown in FIG. 2, storage medium 2200 may also contain an accountholder database 2210. Accountholder database 2210 contains information about an accountholder, including payment accounts (and their Primary Account Numbers) associated with an accountholder, such as an account transaction history. Additionally accountholder database 2210 contains the accountholder's birthdate.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows payment network server 2000 to communicate with merchant 1300 and issuer 1500.

Figure 5:
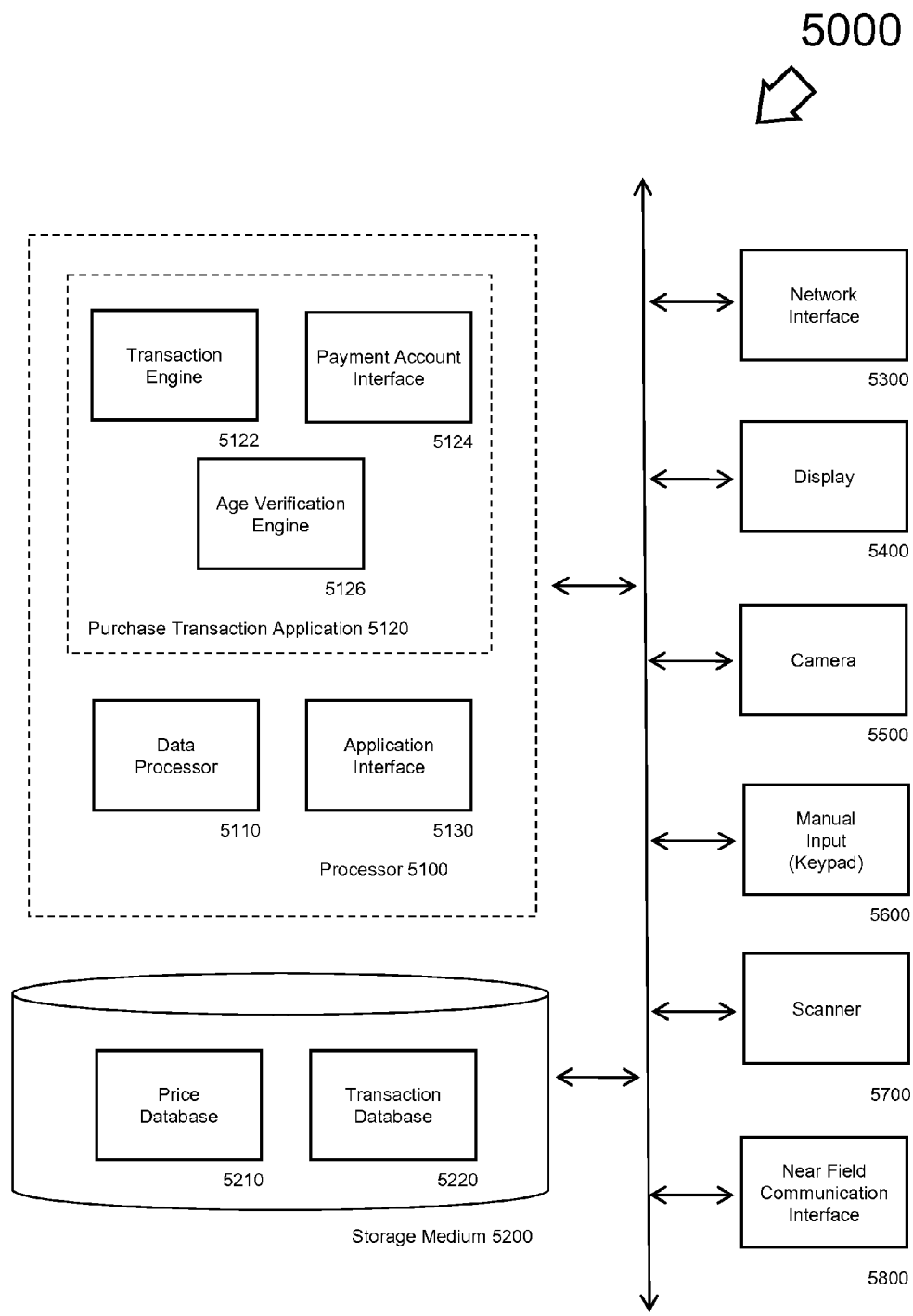
FIG. 5 depicts a diagram of a point-of-sale terminal in a system configured to verify minimum age of accountholders, to enable age restrictions on purchases.

Embodiments will now be disclosed with reference to a block diagram of a point-of-sale terminal 5000 of FIG. 5 designed to verify minimum age of accountholders, to enable age restrictions on purchases, constructed and operative in accordance with an embodiment of the present disclosure. Deployed at merchant 1300, point-of-sale terminal 5000 may be used to process an age-restricted payment account transaction.

Point-of-sale terminal 5000 may be an intelligent cash register, standalone kiosk, tablet computer, or other mobile device used to process a point-of-sale transaction. In this example, point-of-sale terminal 5000 is a cash register. As mentioned above, it is understood by those familiar with the art that point-of-sale terminal 5000 may be a mobile phone, tablet computer, personal digital assistant (PDA) or other portable computing device known in the art capable of verifying minimum age of accountholders, to enable age restrictions on purchases.

Point-of-sale terminal 5000 may run a real-time multi-tasking operating system (OS) and include at least one processor or central processing unit (CPU) 5100, a non-transitory computer-readable storage medium 5200, a network interface 5300, a display 5400, and a camera 5500. Point-of-sale terminal 5000 may further include manual input 5600, and an optical scanner 5700.

Processor 5100 may be any central processing unit, microprocessor, micro-controller, computational device or circuit known in the art. It is understood that processor 5100 may temporarily store instructions and data in Random Access Memory (not shown).

As shown in FIG. 5, processor 5100 is functionally comprised of a data processor 5110, a purchase transaction application 5120, and application interface 5130.

Data processor 5110 enables processor 5100 to interface with storage medium 5200, network interface 5300, display 5400, camera 5500, manual input 5600, scanner 5700, computer memory or any other component not on the processor 5100. The data processor 5110 enables processor 5100 to locate data on, read data from, and write data to these components.

Application interface 5130 may be any graphical user interface known in the art to facilitate communication with the user of the point-of-sale terminal 5000; as such, application interface 5130 may communicate with the user via display 5400, camera 5500, manual input 5600, or scanner 5700.

Purchase transaction application 5120 enables the functionality to facilitate an age-restricted financial transaction. Purchase transaction application 5120 may further comprise: transaction engine 5122, payment account interface 5124, and age verification engine 5126.

A transaction engine 5122 is the structure that enables purchase transaction application 5120 to obtain the price of a good or service from price database 5210, and tally the items and services purchased or returned.

Payment account interface 5124 enables the transaction engine 5122 to process payment accounts in a financial transaction.

Age verification engine 5126 is the structure that enables age verification in an age-restricted purchase transaction. In some embodiments, age verification engine 5126 communicates the minimum age requirement for an age-restricted purchase, as stored in a price database 5210.

These structures may be implemented as hardware, firmware, or software encoded on a computer readable medium, such as storage medium 5200. Further details of these components are described with their relation to method embodiments below.

Network interface 5300 may be any data port as is known in the art for interfacing, communicating or transferring data across a computer network.

Display 5400 may be any liquid crystal display (LCD) display, light emitting diode (LED) screen, touch-sensitive screen, or other monitor known in the art for visually displaying images and text to a user.

A camera 5500 may be any image capture device configured to capture the image of an accountholder. Scanner 5700 may be any optical scanner to capture barcode images, as is known in the art. In some embodiments, camera 5500 may also act as scanner 5700. It is understood that scanner 5700 and camera 5500 may include appropriate digital-to-analog and analog-to-digital conversion circuitry as appropriate.

Manual input 5600 may be buttons, a conventional keyboard, keypad, track pad, trackball, or other input device as is known in the art for the manual input of data. In some embodiments, manual input 5600 may be integrated into a touch-sensitive display 5400. In other embodiments, manual input 5600 may be a virtual keyboard.

Storage medium 5200 may be a conventional read/write memory such as a flash memory, memory stick, transistor-based memory, or other computer-readable memory device as is known in the art for storing and retrieving data.

In addition, as shown in FIG. 5, storage medium 5200 may also contain a price database 5210 and transaction database 5220. A price database 5210 includes pricing records for products and services at merchant 1300. Transaction database 5220 includes records for all transactions that occur at point-of-sale terminal 5000. It is understood by those familiar with the art that these databases 5210-5220 may be combined in a myriad of combinations.

Figure 3:
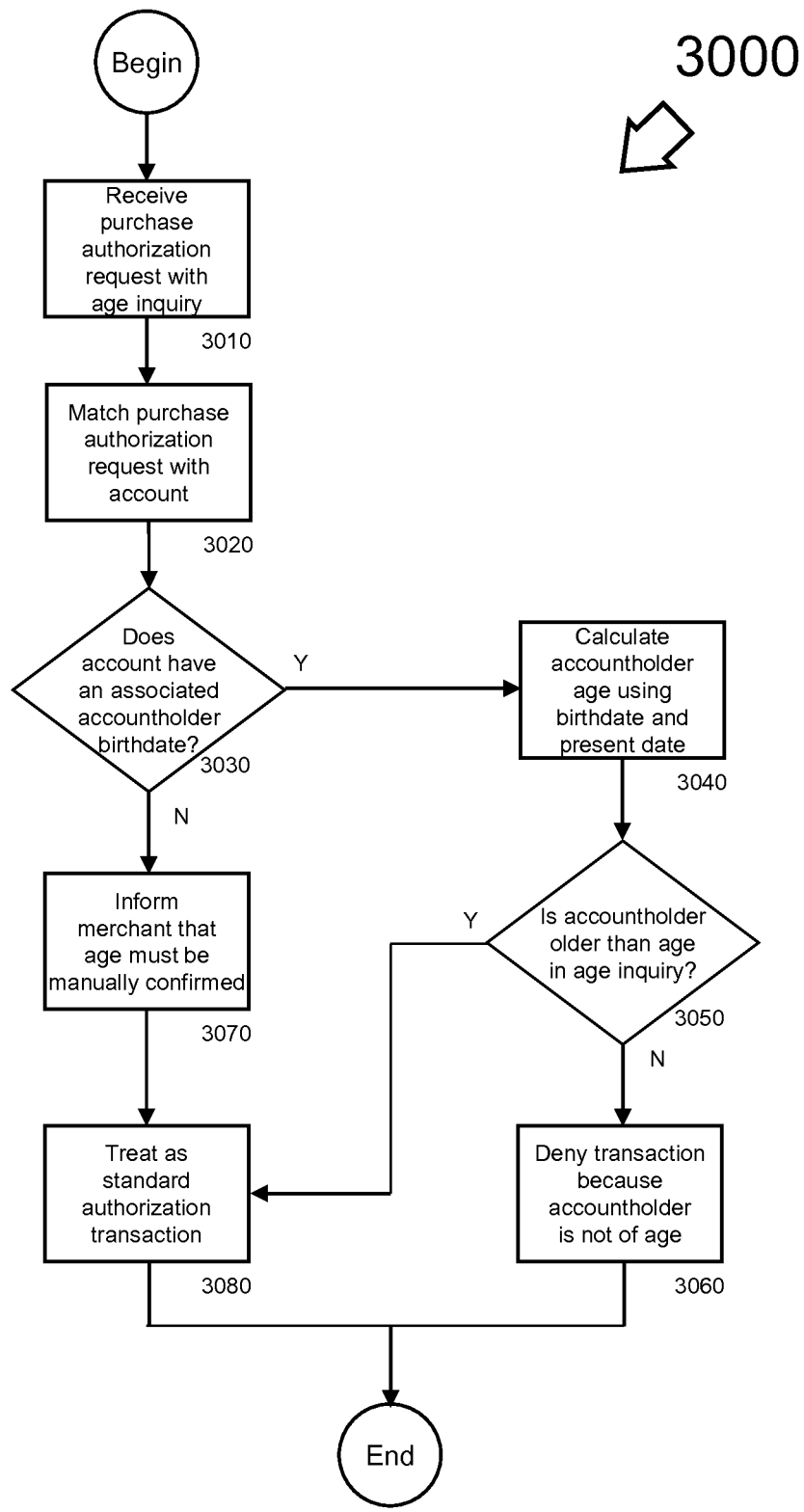
FIG. 3 illustrates a real time authorization process, from the perspective of a payment network, to verify minimum age of accountholders, to enable age restrictions on purchases.
Figure 4:
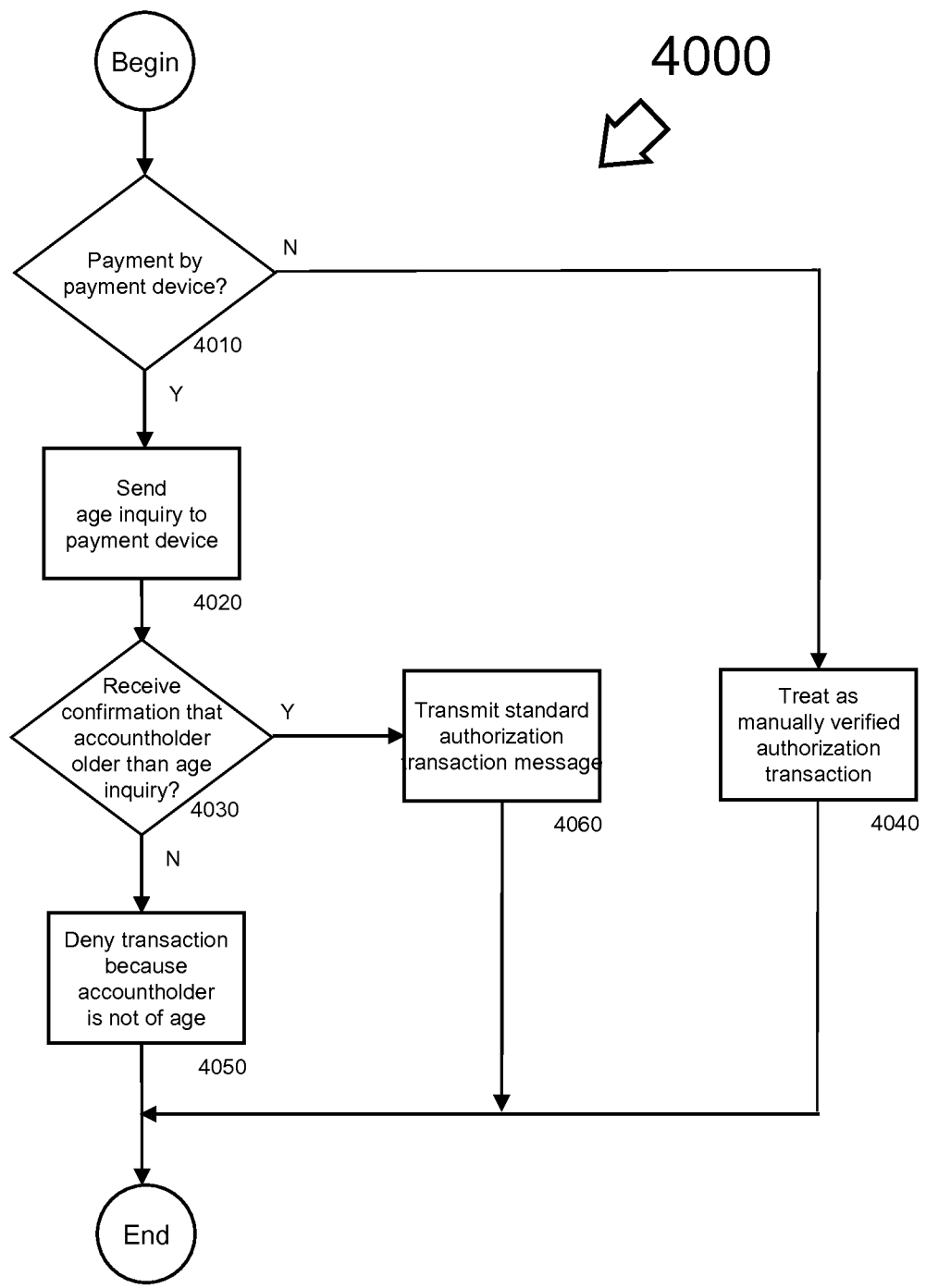
FIG. 4 illustrates a method, from the perspective of a merchant point-of-sale device, to verify minimum age of accountholders, to enable age restrictions on purchases.

We now turn our attention to a method or process embodiment of the present disclosure, FIGS. 3 and 4. It is understood by those known in the art that instructions for such method embodiments may be stored on their respective computer-readable memory and executed by their respective processors. It is understood by those skilled in the art that other equivalent implementations can exist without departing from the spirit or claims of the invention.

Embodiments verify minimum age of accountholders by using the present date and a stored accountholder birthdate.

FIG. 3 illustrates a process 3000, from the perspective of a payment network, to verify minimum age of accountholders, to enable age restrictions on purchases, constructed and operative in accordance with an embodiment of the present disclosure. It is understood by those familiar with the art that process 3000 may be a real-time authentication process.

At block 3010, payment network 2000 receives a purchase authorization request from an acquirer 1400. The purchase authorization request is received electronically via a network interface, and contains transaction data including: an account identifier for a payment account (which can be a Primary Account Number), an amount of the transaction, a transaction type (purchase, return, cash-advance, and the like), and a minimum age inquiry. Suppose, for example, the minimum age to buy alcohol is 21-years; the minimum age inquiry for an alcohol transaction could be sent as "21."

Payment-purchase engine 2130 matches the purchase authorization request with an account in the accountholder database 2210, block 3020. Generally, the account identifier (Primary Account Number) of the purchase authorization request is used for the matching.

At decision block 3030, the age identifier determines whether the matched account has an associated accountholder birthdate stored in the accountholder database 2210. If not, the merchant 1300 is informed, via the network interface 2300, that the accountholder's age must be manually confirmed, block 3070 and the process continues at block 3080. If the matched account has an associated accountholder birthdate, the process flow continues at block 3040.

At block 3040, the age verifier 2110 calculates the accountholder age using the associated accountholder birthdate and the present date.

If the accountholder is equal to or older than the age specified by the minimum age inquiry, as determined by the age verifier 2110 at decision block 3050, the process continues at block 3080. If the accountholder is not older than the minimum age inquiry, the transaction is denied because the accountholder is not of age, at block 3060. The network interface sends the denial to acquirer 1400 for forwarding to the merchant 1300. In some embodiments, the automatic denial may also be sent by network interface 2300 to issuer 1500.

At block 3080, the purchase authorization request is treated as a standard authorization transaction. In such a transaction, the purchase authorization request is fraud-scored, and the purchase transaction request is forwarded to issuer 1500 along with the fraud score. The fraud-scoring is based at least in part on the purchase authorization request and prior spending behavior as derived from the accountholder database 2210.

FIG. 4 illustrates a real-time method 4000, from the perspective of a merchant point-of-sale device 5000, to verify minimum age of accountholders when payment is being made by a payment device 1100.

At block 4010, merchant point-of-sale device 5000 begins processing a payment for an age-restricted good or service where payment is being made by a payment device 5000. The point-of-sale device 5000 has determined that an age-restricted good or service is being purchased.

When the payment is not made by a payment device 5000, for example payment is being made by a payment card, the transaction is treated as a standard authorization transaction where the accountholder age is manually verified, block 4040. The merchant point-of-sale device 5000 formats the authorization transaction message to the acquirer 1400 or payment network 2000. The authorization transaction message includes the type of transaction, a merchant identifier, the amount of transaction, and an account identifier; the account identifier may be a Primary Account Number. Additionally, the merchant sales person is notified, via display 5400, that a manual confirmation of the accountholder's age is required.

When the payment is made by a payment device 5000, the process flow continues at block 4020.

At block 4020, the age verification engine 5126 electronic queries the payment device 1100b with network interface 5300 or Near Field Communication interface 5800 (collectively, "communication interface"), asking whether the accountholder is of age. The query electronic may be as transmitting the minimum age. Suppose, for example, the minimum age to buy cigarettes is 18-years; the minimum age inquiry for such a transaction could be sent as "18."

At decision block 4030, network interface 5300 or Near Field Communication interface 5800 receives the response from payment device 1100b, which confirms whether the accountholder is older than the minimum age inquiry. The response may be a number (age of accountholder), a yes/no indicator, a birthdate, or other indicator of age.

When the accountholder age is verified as older, the merchant point-of-sale device 5000 formats the authorization transaction message to the acquirer 1400 or payment network 2000, block 4060. The authorization transaction message including the type of transaction, a merchant identifier, the amount of transaction, and an account identifier; the account identifier may be a Primary Account Number.

When the accountholder age is not of the minimum age inquiry, the merchant point-of-sale device 5000 denies the transaction because the accountholder is not of age, block 4050. The denial is displayed on display 5400. In some embodiments, the denial is automatic, and the issuer 1500 is not informed of the attempted transaction; in other embodiments, the denial is still automatic, but the issuer 1500 is informed of the attempted transaction by the network interface 5300.

It is understood by those familiar with the art that the system described herein may be implemented in hardware, firmware, or software encoded on a non-transitory computer-readable storage medium.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method comprising:
   receiving, at a payment network from an acquirer, transaction data comprising data indicative of a primary account number associated with an accountholder and a minimum age inquiry, wherein a point of sale device associated with the acquirer received the primary account number from an electronic wallet of a mobile device of the accountholder, and wherein the minimum age inquiry is generated by the point of sale device and comprises data indicative of a minimum transaction age required to purchase a product associated with the transaction;
   determining, at the payment network, an accountholder age based on a database entry and a present date, wherein the database entry is associated with the primary account number and comprises a birthdate associated with the accountholder; and
   transmitting, to the acquirer, an inquiry response comprising data indicative of the birthdate, wherein the inquiry response causes the point of sale device to decline the transaction when the accountholder age is less than the minimum transaction age.

2. The method of claim 1, wherein the minimum transaction age is a number.

3. The method of claim 2, wherein the transaction data further comprises a transaction type identifier and a transaction amount.

4. The method of claim 3, wherein the database entry comprises an account transaction history.

5. The method of claim 4, further comprising:
   determining a fraud score associated with the payment transaction based at least in part on the transaction data and the database entry, wherein the fraud score is determined only when the accountholder age is equal to or greater-than the minimum transaction age.

6. The method of claim 5, further comprising:
   transmitting, to an issuer associated with the primary account number, the transaction data and the fraud score.

7. The method of claim 6, further comprising:
   transmitting, to the issuer, when the accountholder age is less than the minimum transaction age, a decline message.

8. A system comprising:
   a first network interface of a payment network configured to receive, from an acquirer, transaction data comprising data indicative of a primary account number associated with an accountholder and a minimum age inquiry, wherein a point of sale device associated with the acquirer received the primary account number from an electronic wallet of a mobile device of the accountholder, and wherein the minimum age inquiry is generated by the point of sale device and comprises data indicative of a minimum transaction age required to purchase a product associated with the transaction;

a processor of the payment network configured to determinen accountholder age based on a database entry and a present date, wherein the database entry is associated with the primary account number and comprises a birthdate associated with the accountholder; and a second network interface of the payment network configured to transmit, to the acquirer, an inquiry response comprising data indicative of the birthdate, wherein the inquiry response causes the point of sale device to decline the transaction when the accountholder age is less than the minimum transaction age.

9. The system of claim 8, wherein the minimum transaction age is a number.

10. The system of claim 9, wherein the transaction data further comprises a transaction type identifier and a transaction amount.

11. The system of claim 10, wherein the database entry comprises an account transaction history.

12. The system of claim 11, wherein the processor is further configured to determine a fraud score associated with the transaction based at least in part on the transaction data and the database entry, wherein the fraud score is determined only when the accountholder age is equal to or greater-than the minimum transaction age.

13. The system of claim 12, wherein the second network interface is further configured to transmit, to an issuer associated with the primary account number, the transaction data and the fraud score.

14. The system of claim 13, wherein the second network interface is further configured to transmit to the issuer, when the accountholder age is less than the minimum transaction age, a decline message.

15. A non-transitory computer readable storage medium having a set of computer-executable instructions encoded thereon, which when executed by a processor coupled thereto cause the processor to:

receive, from an acquirer, transaction data comprising data indicative a primary account number associated with an accountholder and a minimum age inquiry, wherein a point of sale device associated with the acquirer received the primary account number from an electronic wallet of a mobile device of the accountholder, and wherein the minimum age inquiry is generated by the point of sale device and comprises data indicative of a minimum transaction age required to purchase a product associated with the transaction;

determine an accountholder age based on a database entry and a present date, wherein the database entry is associated with the primary account number and comprises a birthdate associated with the accountholder; and transmitting, to the acquirer, an inquiry response comprising data indicative of the birthdate, wherein the inquiry response causes the point of sale device to decline the transaction when the accountholder age is less than the minimum transaction age.

16. The non-transitory computer readable storage medium of claim 15, wherein the minimum transaction age is a number.

17. The non-transitory computer readable storage medium of claim 16, wherein the transaction data further comprises a transaction type identifier and a transaction amount.

18. The non-transitory computer readable storage medium of claim 17, wherein the database entry comprises an account transaction history.

19. The non-transitory computer readable storage medium of claim 18, wherein the computer-executable instructions further cause the processor to:

determine, based at least in part on the transaction data and the database entry, a fraud score associated with the transaction, wherein the fraud score is determined only when the accountholder age is equal to or greater-than the minimum transaction age.

20. The non-transitory computer readable storage medium of claim 19, wherein the computer-executable instructions further cause the processor to:

transmit, to an issuer associated with the primary account number, the transaction data and the fraud score.

* * * * *